United States Patent
Li et al.

(10) Patent No.: US 10,763,938 B2
(45) Date of Patent: Sep. 1, 2020

(54) BEAM INFORMATION FEEDBACK METHOD AND USER APPARATUS

(71) Applicant: NTT DOCOMO, INC., Tokyo (JP)

(72) Inventors: Huiling Li, Beijing (CN); Chongning Na, Beijing (CN); Yuichi Kakishima, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 16/607,123

(22) PCT Filed: Apr. 19, 2018

(86) PCT No.: PCT/CN2018/083732
§ 371 (c)(1),
(2) Date: Oct. 22, 2019

(87) PCT Pub. No.: WO2018/201910
PCT Pub. Date: Nov. 8, 2018

(65) Prior Publication Data
US 2020/0136705 A1    Apr. 30, 2020

(30) Foreign Application Priority Data

May 4, 2017 (CN) .......................... 2017 1 0308229

(51) Int. Cl.
*H04B 7/06* (2006.01)
*H04B 7/0408* (2017.01)
*H04B 7/0413* (2017.01)

(52) U.S. Cl.
CPC ......... *H04B 7/0639* (2013.01); *H04B 7/0408* (2013.01); *H04B 7/0413* (2013.01); *H04B 7/0626* (2013.01)

(58) Field of Classification Search
CPC .. H04B 7/0617; H04B 7/0619; H04B 7/0639; H04B 7/0408
See application file for complete search history.

(56) References Cited

U.S. PATENT DOCUMENTS

2017/0094531 A1* 3/2017 Kakishima ............ H04W 24/10

FOREIGN PATENT DOCUMENTS

| CN | 101567762 A | 10/2009 |
|---|---|---|
| CN | 101689901 A | 3/2010 |

(Continued)

OTHER PUBLICATIONS

International Search Report from counterpart PCT/CN2018/083732, dated Jul. 4, 2018.

(Continued)

*Primary Examiner* — Kevin Kim
(74) *Attorney, Agent, or Firm* — Osha Liang LLP

(57) ABSTRACT

Provided is a beam information feedback method performed by a user equipment, comprising: determining a first beam and a plurality of second beams according to a beam selection result; transmitting beam indexes of the plurality of second beams to a base station according to the beam power of the plurality of second beams; transmitting wideband beam information correspondingly to the beam indexes of the plurality of second beams; and transmitting subband beam information correspondingly to the beam indexes of the plurality of second beams.

18 Claims, 9 Drawing Sheets

(56) References Cited

FOREIGN PATENT DOCUMENTS

| CN | 102326339 A | 1/2012 |
|----|-------------|--------|
| CN | 105612780 A | 5/2016 |

OTHER PUBLICATIONS

International Preliminary Report on Patentability from counterpart PCT/CN2018/083732, including the English translation of the Written Opinion, dated Nov. 5, 2019.

* cited by examiner

| | Wideband amplitude information | Subband amplitude information | Subband phase information | Subband co-phase information |
|---|---|---|---|---|
| First beam b1 | - | - | - | 2bit |
| Second beam b4 | 3bit | 1bit | 2bit | 2bit |
| Second beam b8 | 3bit | 0 | 2bit | 2bit |
| Second beam b12 | 3bit | 0 | 2bit | 2bit |

|  | Wideband amplitude information | Available beam power levels (absolute value) |
|---|---|---|
| Beam b4 | 3bit | $\{1, \sqrt{0.5}, \sqrt{0.25}, \sqrt{0.125}, \sqrt{0.0625}, \sqrt{0.0313}, \sqrt{0.0156}, 0\}$ |
| Beam b8 | 2bit | $\{\sqrt{0.5}, \sqrt{0.25}, \sqrt{0.125}, \sqrt{0.0625}\}$ |
| Beam b12 | 2bit/1 bit | $\{\sqrt{0.0625}, \sqrt{0.0313}, \sqrt{0.0156}, 0\} / \{\sqrt{0.0156}, 0\}$ |

FIG. 9A

|  | Wideband amplitude information | Available beam power levels (ratio value) |
|---|---|---|
| Beam b4 | 3bit | $\{1, \sqrt{1/2}, \sqrt{1/4}, \sqrt{1/8}, \sqrt{1/16}, \sqrt{1/32}, \sqrt{1/64}, 0\}$ |
| Beam b8 | 2bit | $\{1, \sqrt{1/2}, \sqrt{1/4}, \sqrt{1/8}\}$ |
| Beam b12 | 2bit/1 bit | $\{1, \sqrt{1/2}, \sqrt{1/4}, 0\} / \{\sqrt{1/4}, 0\}$ |

FIG. 9B

BEAM INFORMATION FEEDBACK METHOD AND USER APPARATUS

CROSS-REFERENCE TO RELATED APPLICATIONS

This application is a 371 U.S. National State of International Application No. PCT/CN2018/083732, filed on Apr. 19, 2018, which claims priority to Chinese Application No. 201710308229.5, filed on May 4, 2017. The entire disclosures of the above applications are incorporated herein by reference.

TECHNICAL FIELD

The present disclosure relates to the field of wireless communications, and particularly, to a beam feedback method performed by a user equipment and a corresponding user equipment.

BACKGROUND

In order to improve throughput of a communication system, full dimensional multiple input multiple output (Full Dimensional MIMO, FD-MIMO) and massive multiple input multiple output (Massive MIMO) antennas have been proposed. Compared with traditional MIMO systems, a base station can use more beams to perform data transmission with user equipment in FD-MIMO and Massive MIMO systems.

In order to feed back the beam information of the multiple beams, it has been proposed to divide the remaining beams among the multiple beams except the beam with the strongest power into two groups, transmit the grouping information of the remaining beams to the base station, and perform respective beam information feedback for the two groups of beams according to the grouping information. However, such beam feedback method requires the transmission of the grouping information which indicates grouping of the beams, so as to indicate respective beam feedback information.

SUMMARY

According to an aspect of the present disclosure, a beam information feedback method performed by a user equipment is provided, the method comprising: determining a first beam and a plurality of second beams according to a beam selection result; transmitting beam indexes of the plurality of second beams to a base station according to the beam power of the plurality of second beams; transmitting wideband beam information correspondingly to the beam indexes of the plurality of second beams; and transmitting subband beam information correspondingly to the beam indexes of the plurality of second beams.

According to another aspect of the present disclosure, a user equipment is provided, the user equipment comprising: a determining unit configured to determine a first beam and a plurality of second beams according to a beam selection result; a transmitting unit configured to transmit beam indexes of the plurality of second beams to a base station according to the beam power of the plurality of second beams; transmit wideband beam information correspondingly to the beam indexes of the plurality of second beams, and transmit subband beam information correspondingly to the beam indexes of the plurality of second beams.

In the beam information feedback method performed by the user equipment and the corresponding user equipment in the above aspects of the present disclosure, the beam indexes of the plurality of second beams are transmitted to the base station according to the beam power of the plurality of second beams, and the wideband beam information and the subband beam information are transmitted correspondingly to the beam indexes of the plurality of second beams, such that even if the grouping information is not transmitted to the base station, the base station can obtain the required information about the beam power according to the beam indexes received from the user equipment, and determine the beam information corresponding to a particular beam, thereby saving signaling overhead.

Other features and advantages of the present disclosure will be set forth in the description which follows, and partially will be apparent from the description, or will be understood by practice of the present disclosure. The objectives and other advantages of the present disclosure may be realized and obtained by means of the structure particularly pointed in the description, claims and drawings.

BRIEF DESCRIPTION OF THE DRAWINGS

The accompanying drawings are included to provide a further understanding of the present disclosure, and constitutes a part of the description, which is used to explain the present invention together with the embodiments of the present invention, and does not constitute a limitation of the invention, in which:

FIG. 9A is a schematic diagram showing another example of determining the bit number required for the beam information of respective beams in the second beams according to an embodiment of the present disclosure;

FIG. 9B is a schematic diagram showing yet another example of determining the bit number required for the beam information of respective beams in the second beams according to an embodiment of the present disclosure;

DETAILED DESCRIPTION

Figure 1:
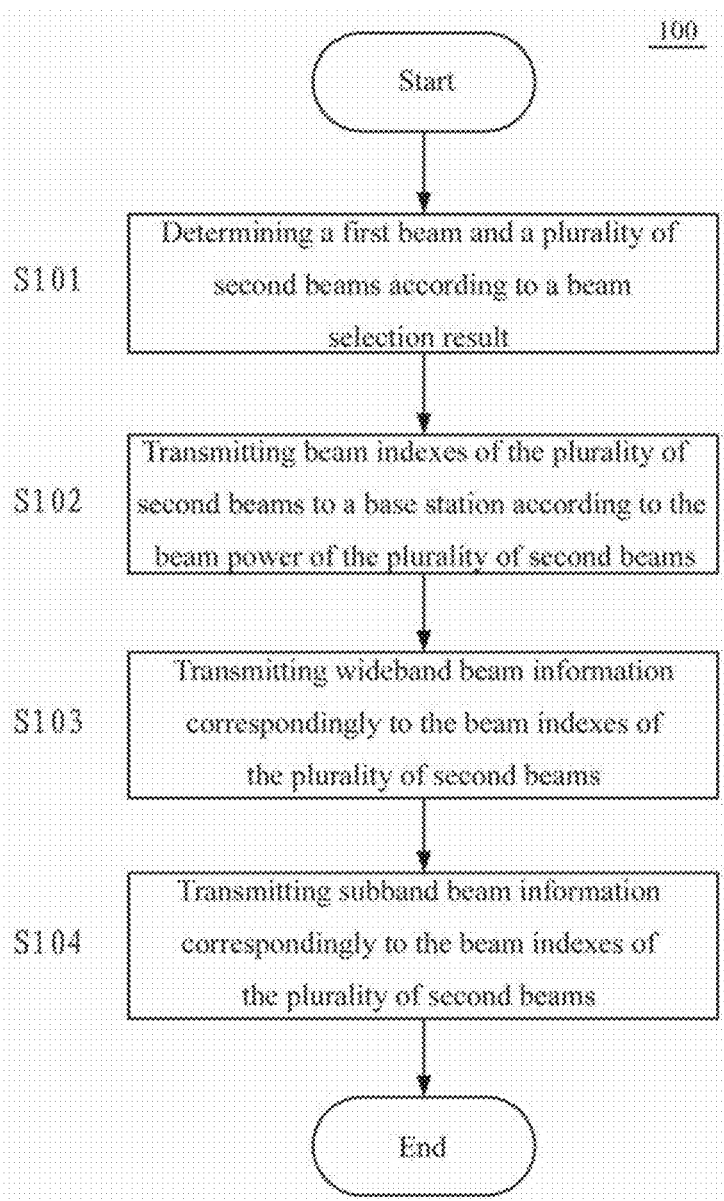
FIG. 1 is a flow chart showing a beam information feedback method performed by a user equipment according to an embodiment of the present disclosure.

A beam feedback method performed by a user equipment and a corresponding user equipment according to the embodiments of the present disclosure will be described below with reference to the accompanying drawings. In the drawings, same reference numerals usually indicate same components. Apparently, the described embodiments are only a part but not all of the embodiments of the present disclosure. It should be understood that the embodiments described herein are illustrative only and should not be construed as limitation of the scope of the present disclosure. All other embodiments obtained by a person skilled in the art based on the embodiments of the present disclosure described herein without creative effort fall within the scope of the present disclosure.

In the embodiments according to the present disclosure, when performing beam information feedback, the feedback may be made for characteristics of a beam in a wideband, or made for characteristics of a beam in a subband, wherein one wideband may include a plurality of subbands. The parameters included in the beam information transmitted by the user equipment when the feedback is made for the characteristics of the beam in the wideband may be at least partially different from the parameters included in the beam information transmitted by the user equipment when the feedback is made for the characteristics of the beam in the subband. Further, in the embodiments according to the present disclosure, the parameters included in the feedback information of the beams with different power may be different.

Firstly, a beam information feedback method performed by a user equipment according to an embodiment of the present disclosure will be described with reference to FIG. 1.

FIG. 1 shows a flow chart of a beam information feedback method performed by a user equipment. As shown in FIG. 1, in step S101, a first beam and a plurality of second beams are determined according to a beam selection result. According to an embodiment of the present disclosure, a base station may transmit reference signals about a plurality of beams to a user equipment, and according to the channel measurement result, the user equipment may select the first beam and the plurality of second beams available for the user equipment from among the beams transmitted by the base station. According to another embodiment of the present disclosure, the first beam may have the highest beam power among the selected beams, and the second beam may be a beam from among the beams selected by the user equipment other than the first beam.

Figure 2:
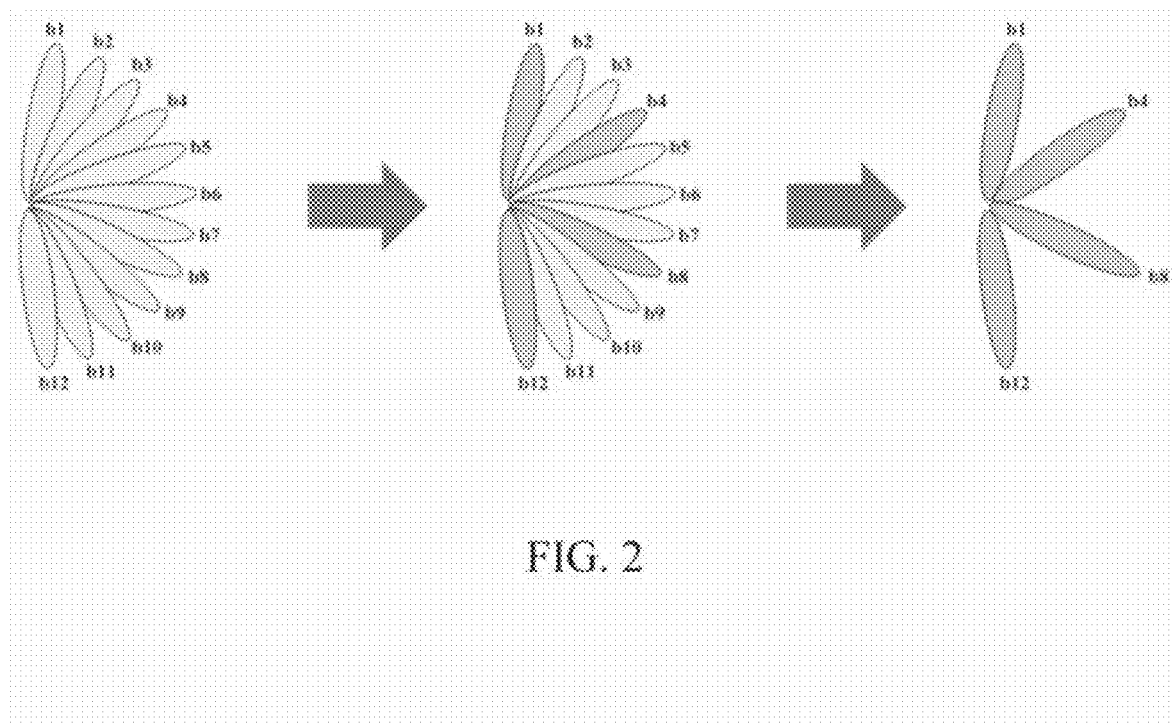
FIG. 2 is a schematic diagram showing an example of determining a first beam and a plurality of second beams from a beam selection result according to an embodiment of the present disclosure.

FIG. 2 shows an example of determining the first beam and the plurality of second beams from the beam selection result in step S101. As shown in FIG. 2, the base station transmits reference signals about a plurality of beams to the user equipment, and the user equipment first selects the beams b1, b4, b8, b12 from among the plurality of beams b1-b12 by an appropriate beam selection method (for example, according to the channel measurement result). It is assumed that the beam power level of the first beam b1 is 1, the beam power level of the second beam b4 relative to the first beam b1 is ½, the beam power level of the beam b8 relative to the first beam b1 is ⅛, and the beam power level of the beam b12 relative to the first beam b1 is ¼, then beam b1 is determined as the first beam, and the beams b4, b8, b12 are determined as the second beams. It should be understood that the beam power levels are predefined, and the defined beam power levels are correlatively stored in the base station and the user equipment.

In step S102, the beam indexes of the plurality of second beams are transmitted to the base station according to the beam power of the plurality of second beams. According to an embodiment of the present disclosure, the beam index may be included in a Precoding Matrix Indicator (PMI).

Figure 3A:
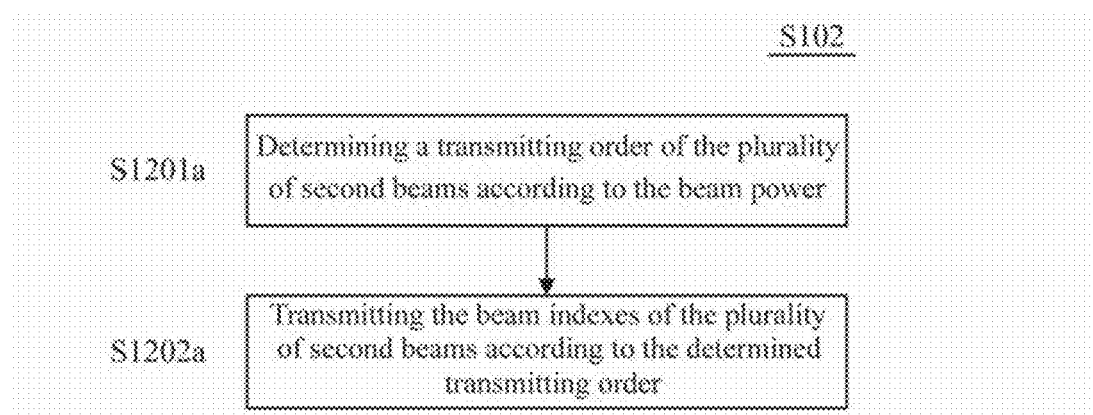
FIG. 3A is a flowchart illustrating an example of transmitting the beam indexes of the plurality of second beams to a base station according to the beam power of the plurality of second beams, according to an embodiment of the present disclosure.
Figure 3B:
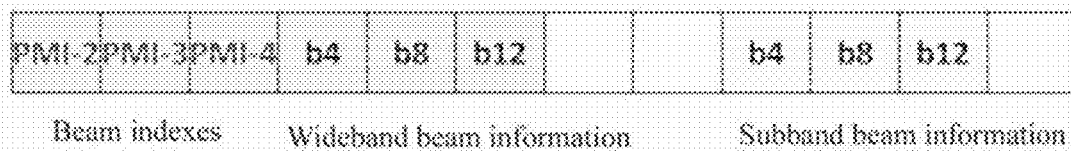
FIG. 3B is a schematic diagram showing an example of transmitting the beam indexes of the plurality of second beams to a base station according to the beam power of the plurality of second beams according to an embodiment of the present disclosure.

Next, an example of transmitting the beam indexes of the plurality of second beams to a base station according to the beam power of the plurality of second beams according to an embodiment of the present disclosure is described with reference to FIGS. 3A-3B. FIG. 3A shows a flow chart of this example, as shown in FIG. 3A, which may include two sub-steps in step S102. Specifically, in step S1021a, the transmitting order of the plurality of second beams is determined according to the beam power. In step S1022a, beam indexes of the plurality of second beams are transmitted to the base station according to the determined transmitting order. Accordingly, based on the transmitting order of the beam indexes, the base station can obtain information about the beam power of the beams indicated thereby. For example, as described above, it is assumed that the beam power levels of the second beams b4, b8 and b12 are ½, ¼ and ⅛, respectively, then in step S1021a, the beams are arranged in the order of b4, b8 and b12, and in step S1022a, the beam indexes of the beams are transmitted. FIG. 3B shows a schematic diagram of the example. As shown in FIG. 3B, the beams are arranged in the order of b4, b8 and b12 in descending order of the beam power, and PMI-2, PMI-3 and PMI-4 are beam indexes of the beams b4, b12, and b8, respectively, and the arranged beam indexes PMI-2, PMI-3, PMI-4 of the second beams b4, b12, b8 are transmitted to the base station. It should be understood that the beam indexes of the plurality of second beams arranged as described above may also be arranged in other orders, for example, in ascending order of the beam power level, and the beam indexes arranged in the ascending order may be transmitted to the base station.

Figure 4A:
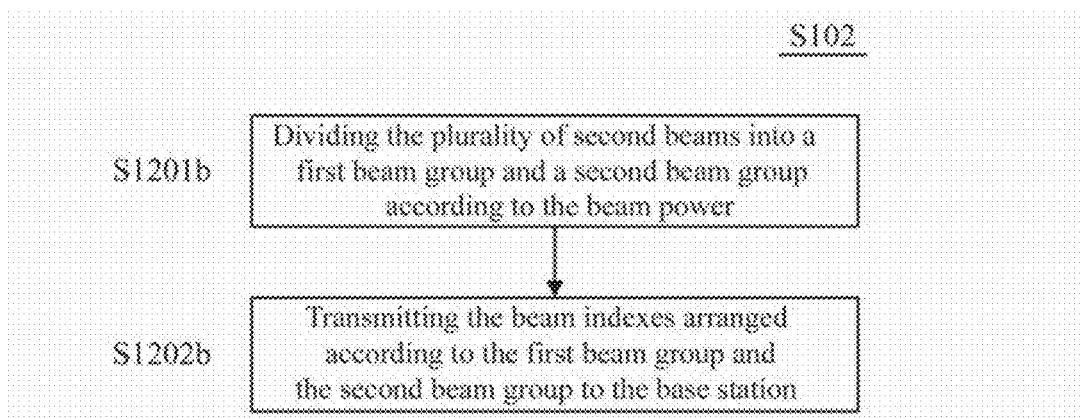
FIG. 4A is a flowchart showing another example of transmitting the beam indexes of the plurality of second beams to a base station according to the beam power of the plurality of second beams, according to an embodiment of the present disclosure.
Figure 4B:
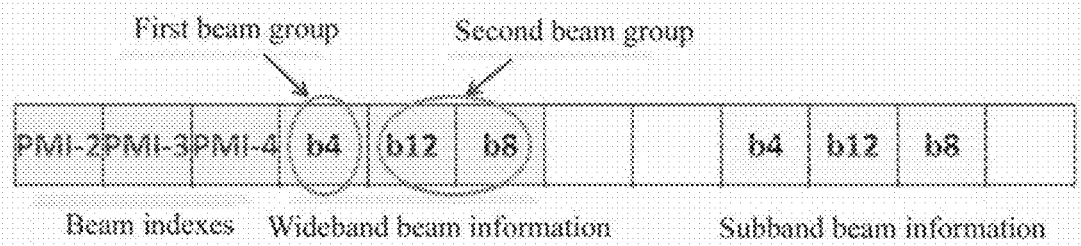
FIG. 4B is a schematic diagram showing another example of transmitting the beam indexes of the plurality of second beams to a base station according to the beam power of the plurality of second beams according to an embodiment of the present disclosure.

Next, another example of transmitting the beam indexes of the plurality of second beams to the base station according to the beam power of the plurality of second beams according to an embodiment of the present disclosure will be described with reference to FIGS. 4A-4B. FIG. 4A shows a flow chart of this example, as shown in FIG. 4A, which may include two sub-steps in step S102. Specifically, in step S1021b, the plurality of second beams may be divided into a first beam group and a second beam group according to the beam power, wherein the beam power of a beam in the first beam group is higher than that of a beam in the second beam group. It should be understood that both the first beam group and the second beam group may include beams in one or more beam selection results, and in the case where the number of the selected beams is large, the number of the grouped beam groups may not be limited to two. In step S1022b, the beam indexes arranged according to the first beam group and the second beam group are transmitted to the base station. In general, the beam indexes may not need to be ordered within the first beam group and the second beam group according to the beam power. Alternatively, the beam indexes of the plurality of beams included in the first beam group or the second beam group may also be arranged, for example, according to the beam power as described above, and the arranged beam indexes are transmitted to the base station. Accordingly, based on the number of beams included in the first beam group and/or the second beam group and the transmitting order of the beam indexes, the base station can obtain information about the beam power of the beams indicated thereby. For example, as described above, it is assumed that the beam power levels of the second beams b4, b8 and b12 are ½, ¼ and ⅛, respectively. Then, in step S1021b, the second beam b4 may be grouped as the first beam group, and the second beams b8, b12 may be grouped as the second beam group, and in S1022b, the beam indexes arranged according to the first beam group and the second beam group are transmitted to the base station. FIG. 4B shows a schematic diagram of the example. As shown in FIG. 4B, the second beam b4 is grouped as the first beam group, and the second beams b8, b12 are grouped as the second beam group, PMI-2 is the beam index of the beam b4 in the first beam group, and PMI-3 and PMI-4 are the beam indexes of the beams b8, b12 in the second beam group, wherein the beams b8, b12 in the second beam group may not be ordered. Further, corresponding beam indexes PMI-2, PMI-3 and PMI-4 are transmitted to the base station in the order arranged according to the first beam group and the second beam group. As described above, alternatively, in step S1021a, b4 and b12 may be grouped as the first beam group, and the second beam b8 may be grouped as the second beam group, then PMI-2 and PMI-3 are the beam indexes of beams b4, b12 in the first beam group, and PMI-4 is the beam index of the beam b8 in the second beam group. Further, in step S1022a, the beam indexes arranged according to the first beam group and the second beam group are transmitted to the base station.

In step S103, wideband beam information is transmitted correspondingly to the beam indexes of the plurality of second beams. And, in step S104, subband beam information is transmitted correspondingly to the beam indexes of the plurality of second beams. It is known that channel state indication (CSI) feedback type I may transmit first channel state information to the base station, and the first channel state information may include channel state feedback type indication (CTI), rank (RI), precoding matrix indicator (PMI) and channel quality indication (CQI), and beam information, etc.; and channel state indication (CSI) feedback type II may transmit second channel state information to the base station, the second channel state information may include beam number information (for example, which may be the superior beam number information as described above), PMI, and beam information, etc. According to an embodiment of the present disclosure, the beam information may include the wideband beam information and the subband beam information. The wideband beam information may include wideband amplitude information, and the subband beam information may include subband amplitude information, subband phase information, and subband co-phase information. The PMI may include a beam index.

It can be seen that the first channel state information and the second channel state information may each include beam information and PMI. Therefore, the user equipment, by using channel state indication (CSI) feedback type I and/or channel state indication (CSI) feedback type II, may transmit the wideband beam information and the subband beam information correspondingly to the beam indexes of the plurality of second beams. It should be understood that the above-mentioned wideband beam information and subband beam information may be transmitted to the base station periodically or non-periodically.

Figure 5:
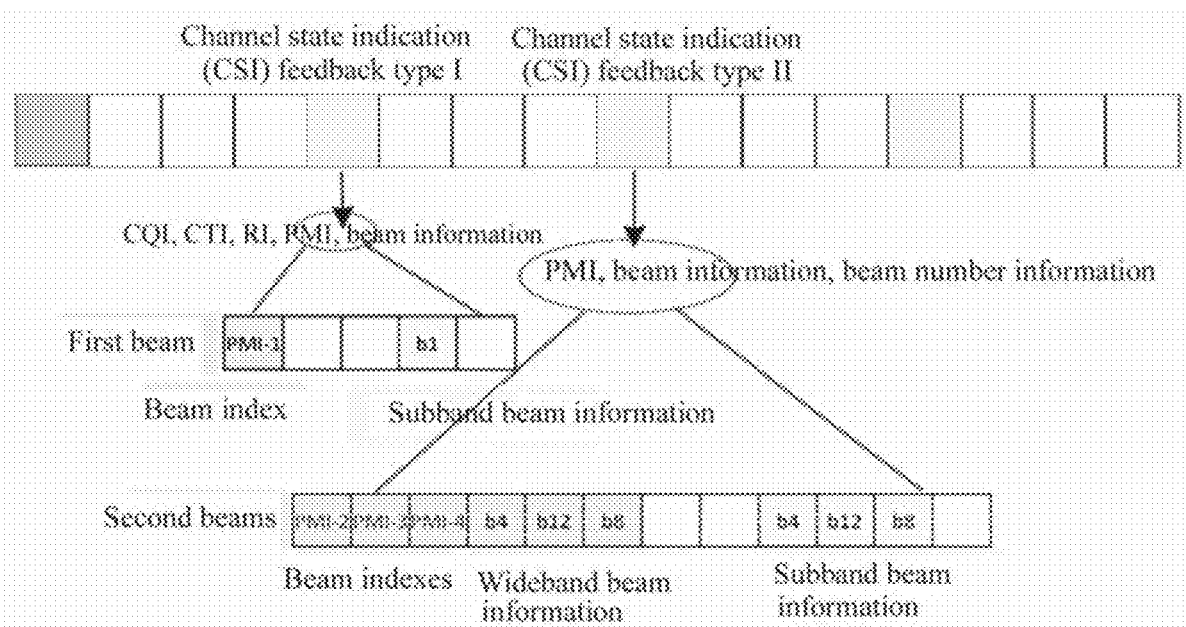
FIG. 5 is a schematic diagram showing an example of feeding back the beam information by using channel state indication (CSI) feedback type I and channel state indication (CSI) feedback type II together, according to an embodiment of the present disclosure.

Next, an example for transmission of beam information of the present disclosure will be described with reference to FIG. 5. FIG. 5 illustrates an example of feeding back the beam information by using channel state indication (CSI) feedback type I and channel state indication (CSI) feedback type II together, that is, transmitting the beam information in a differential manner. According to an embodiment of the present disclosure, as shown in FIG. 5, the user equipment feeds back the beam index and subband beam information of the first beam using channel state indication (CSI) feedback type I, and feeds back the beam indexes, wideband beam information, and subband beam information of the second beams using channel state indication (CSI) feedback type II.

Figure 6:
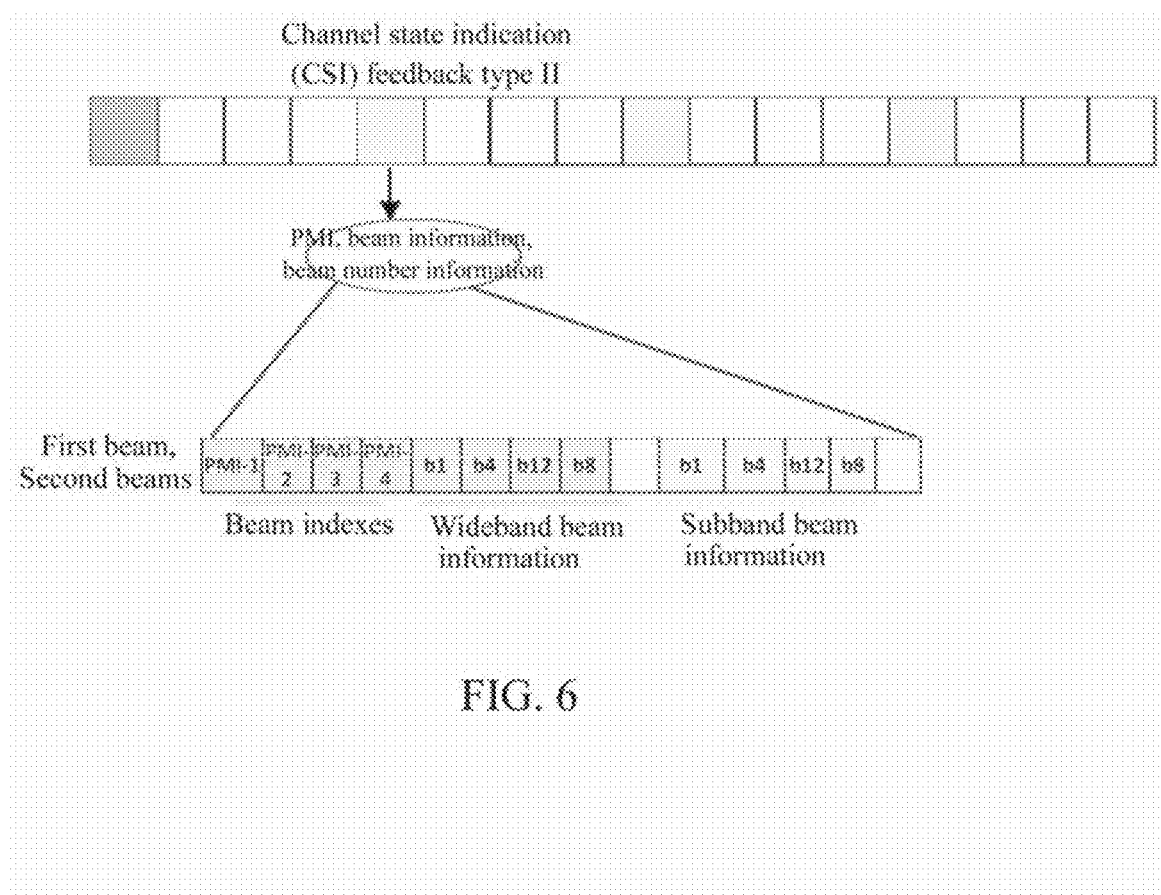
FIG. 6 is a schematic diagram showing an example of feeding back the beam information only through channel state indication (CSI) feedback type II, according to an embodiment of the present disclosure.

Next, another example for transmission of the beam information feedback of the present disclosure will be described with reference to FIG. 6. FIG. 6 shows an example of feeding back the beam information only through channel state indication (CSI) feedback type II. According to another embodiment of the present disclosure, the user equipment transmits the beam index and subband beam information of the first beam, and the beam indexes, wideband beam information and subband with beam information of the plurality of second beams only using channel state indication (CSI) feedback type II. Specifically, as shown in FIG. 6, the user equipment feeds back all of the wideband amplitude information, subband amplitude information, subband phase information, and subband co-phase information of the beams to be fed back to the base station by using channel state indication (CSI) feedback type II.

According to an embodiment of the present disclosure, for the beams having different beam power among the plurality of second beams, different bits may be allocated to the wideband beam information and the subband beam information of the second beams. In other words, for a leading beam with stronger beam power and a weak beam with weaker beam power, the signaling overhead for feeding back their beam information are different, in this way, the signaling overhead can be effectively saved. In this way, it is needed to determine the number of the superior beams in the second beams so as to properly allocate the required bit number.

Figures 7, 8:
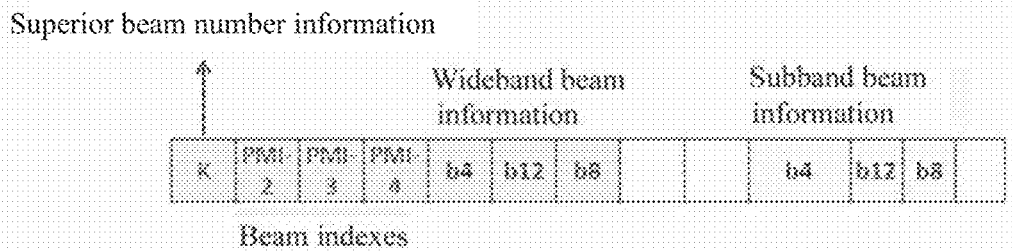
FIG. 7 is a schematic diagram showing an example of feeding back the beam information to a base station by transmitting the number of the superior beams in the plurality of second beams, according to an embodiment of the present disclosure.
FIG. 8 is a diagram showing an example of determining the bit number required for the beam information of respective beams in the second beams according to an embodiment of the present disclosure.

Next, an example of a method of determining the superior beams in the plurality of second beams of the present disclosure will be described with reference to FIG. 7. FIG. 7 illustrates an example of feeding back the beam information to the base station by transmitting the number of the superior beams in the plurality of second beams, wherein the beam power of the superior beam is higher than the beam power of other beams in the second beam group.

According to an embodiment of the present disclosure, as shown in FIG. 7, in steps S103 and S104, in addition to transmitting the wideband beam information and the subband beam information correspondingly to the beam indexes of the plurality of second beams, a new feedback type of superior beam number information K is also transmitted, and the superior beam number information K indicates the number of the superior beams in the plurality of second beams. In other words, by feeding back the superior beam number information K to the base station together with the beam information to be fed back, the base station is able to know that, in addition to the first beam, there are K strong beams in the second beams to be fed back, correspondingly, the remaining second beams are considered to be fed back as weak beams. In this way, in the case where the transmitting order of the plurality of second beams has been determined as described above, in combination with the superior beam number information K, the base station is able to know which specific beams are superior beams (i.e., strong beams), and which are weak beams. For example, in the example shown in FIG. 7, the transmitting order of the second beams is as shown in FIG. 3B, and the superior beam number information K to be transmitted is 1, that is, the number of the superior beams in the plurality of second beams fed back to the base station is 1, then the beam b4 is the superior beam in the second beams. Correspondingly, b8 and b12 are weak beams in the second beams.

According to an embodiment of the present disclosure, in a case where the transmitting order of the plurality of second beams is not determined, a beam power threshold may be determined in advance, and the beam power threshold is compared with the power of the plurality of second beams, so as to determine the superior beam(s) in the plurality of second beams, wherein the beam power of the superior beam is higher than the beam power of other beams in the second beam group. In this way, the plurality of second beams may be divided into the first beam group and the second beam group. For example, the beam power threshold is set to ½ in advance, and the plurality of second beams are compared with the set power threshold. If the second beam is greater than or equal to the power threshold, the second beam is a superior beam, that is, a strong beam. Conversely, if the second beam is lower than the power threshold, the second beam is a weak beam. In this example, as described above, it is assumed that the power level of the selected first beam b1 is 1, the beam power level of the second beam b4 relative to the first beam b1 is ½, the beam power level of the beam b8 relative to the first beam b1 is ⅛, and the beam power level of the beam b12 relative to the first beam b1 is ¼, then the beam b4 is the superior beam in the second beams, and b8, b12 are weak beams in the second beams. Then, in step S102, the beam indexes arranged according to the first beam group and the second beam group are transmitted to the base station, and in steps S103 and S104, the wideband beam information and the subband beam information are transmitted correspondingly to the beam indexes of the plurality of second beams respectively.

According to an embodiment of the present disclosure, after determining the respective numbers of the superior beams and the weak beams, it is also needed to determine the bit number required for the wideband beam information and the subband beam information of the respective superior beams and weak beams, such that the beam information may be appropriately adjusted.

As described above, the first beam b1 having the highest beam power and the plurality of second beams b4, b8, b12 have been determined, and it is assumed that the beam power level of the first beam b1 is 1, the beam power level of the second beam b4 relative to the first beam b1 is ½, the beam power level of the beam b8 relative to the first beam b1 is ⅛, and the beam power level of the beam b12 relative to the first beam b1 is ¼. It should be understood that the beam power levels are predefined, and the defined beam power levels are correlatively stored in the base station and the user equipment.

FIG. 8 shows an example of determining the bit number required for the beam information of the respective beams in the second beams. According to an embodiment of the present disclosure, the same bit number may be allocated to the wideband beam amplitude information of the plurality of second beams. For example, as shown in FIG. 8, the wideband beam amplitude information of the second beams b4, b8 and b12 are each allocated 3 bits to indicate that the beam power of the beam is one of the predefined eight levels. Moreover, different bit numbers may be allocated to the subband beam information of the plurality of second beams. For example, the subband beam amplitude information of the plurality of second beams are allocated different bit numbers. Specifically, as described above, b4 is determined as the leading beam in the second beams by the method as described above, and correspondingly, b8, b12 are weak beams in the second beams. In this case, as shown in FIG. 8, only the subband amplitude information of the leading beam b4 in the second beams is allocated 1 bit to adjust its wideband amplitude information, and no bit is allocated to the subband amplitude information of the beams b8, b12.

FIGS. 9A-9B illustrate another example of determining the bit number required for the beam information of the respective beams in the second beams. According to another embodiment of the present disclosure, the wideband beam amplitude information of the plurality of second beams may be allocated different bit numbers. As previously mentioned, it has been determined that b4 is the leading beam in the second beams, and accordingly, b8, b12 are the weak beams in the second beams. In this case, for example, 3 bits are allocated to the leading beam b4, however, the beam power of the beam b8 may only be lower than or equal to the beam power of the leading beam b4, obviously, the value range of the beam power levels for the beam b8 is small, so fewer bits are needed for the beam b8 to indicate the available beam power levels as compared with the beam b4. Similarly, the value range of the beam power levels for the beam b12 is smaller, so much fewer bits are needed for the beam b12 to indicate the available beam power levels. Specifically, as shown in FIG. 9A, in the case of determining that 3 bits are required for the wideband beam amplitude information of the beam b4, then it is determined that 2 bits are required for the wideband beam amplitude information of the beam b8, and it is determined that 2 or 1 bits are required for the wideband beam amplitude information of the beam b12. In this way, the overhead of signaling can be saved and the wideband amplitude information of the beams can be effectively fed back.

Alternatively, according to another embodiment of the present disclosure, the beam power levels may be represented by a form of its ratio with a previous stronger beam power level. FIG. 9B shows another example of determining the bit number required for the beam information of the respective beams in the second beams. As previously mentioned, it has been determined that b4 is the superior beam in the second beams, and accordingly, b8, b12 are the weak beams in the second beams. Similarly, since the value ranges of the beam power levels of b4, b8 and b12 are in descending order, as shown in FIG. 9B, the superior beam b4 may be allocated 3 bits to indicate the ratio between the beam b4 and the first beam b1, the beam b8 which requires small number of bits is allocated 2 bits to indicate the ratio between the beam b8 and the superior beam b4, and the beam b12 which requires smaller number of bits is allocated 2 or 1 bits to indicate the ratio between the beam b12 and the superior beam b8.

Figure 10:
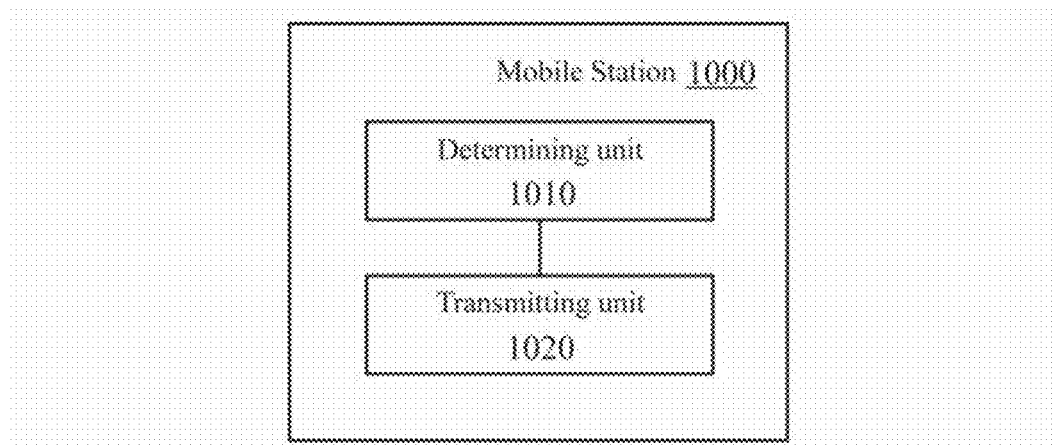
FIG. 10 is a configuration diagram showing a user equipment according to an embodiment of the present disclosure.

Next, a user equipment according to an embodiment of the present disclosure will be described with reference to FIG. 10. FIG. 10 shows a configuration diagram of a user equipment 1000 according to an embodiment of the present disclosure. As shown in FIG. 10, the user equipment 1000 includes: a determining unit 1010 configured to determine a first beam and a plurality of second beams according to a beam selection result; and a transmitting unit 1020 configured to transmit the beam indexes of the plurality of second beams to a base station according to the beam power of the plurality of second beams. It should be understood that the user equipment 1000 may include other components in addition to the above-described units, however, since these components are not related to the content of the embodiment of the present disclosure, the illustration and description thereof are omitted herein. Further, since the specific details of the following operations performed by the user equipment 1000 according to the embodiment of the present disclosure are the same as those of the beam feedback method described above, the repeated description of the same details is omitted here to avoid repetition.

According to an embodiment of the present disclosure, the base station may transmit reference signals about a plurality of beams to the user equipment, and the determining unit 1010 may determine, according to the channel measurement result, the first beam and the plurality of second beams available for the user equipment from among the beams transmitted by the base station. According to another embodiment of the present disclosure, the first beam may have the highest beam power among the selected beams, and the second beam may be a beam from among the beams selected by the user equipment other than the first beam.

According to another embodiment of the present disclosure, the transmitting unit 1020 may determine the transmitting order of the plurality of second beams according to the beam power, and transmit the beam indexes of the plurality of second beams according to the determined transmitting order. Accordingly, based on the transmitting order of the beam indexes, the base station may obtain information about the beam power of the beams indicated thereby.

Specifically, as described above, the first beam b1 having the highest beam power, and the plurality of second beams b4, b8, b12 have been determined, and it is further assumed that the power level of the first beam b1 is 1, the beam power level of the second beam b4 relative to the first beam b1 is ½, the beam power level of the beam b8 relative to the first beam b1 is ⅛, and the beam power level of the beam b12 relative to the first beam b1 is ¼.

According to an embodiment of the present disclosure, the transmitting unit 1020 arranges the beam indexes of the plurality of second beams in descending order of the beam power, and then PMI-2, PMI-3 and PMI-4 are the beam indexes of the beams b4, b12, and b8, respectively. It should be understood that the beam indexes of the plurality of second beams arranged as described above may also be arranged in other orders, for example, in ascending order of the beam power level, and the beam indexes arranged in the ascending order may be transmitted to the base station.

According to another embodiment of the present disclosure, the user equipment 1000 may further include a grouping unit 1030 configured to divide the plurality of second beams into a first beam group and a second beam group according to the beam power, wherein the beam power of a beam in the first beam group is higher than that of a beam in the second beam group; and the transmitting unit 1020 transmits the beam indexes arranged according to the first beam group and the second beam group to the base station. It should be understood that both the first beam group and the second beam group may include beams in one or more beam selection results, and in the case where the number of the selected beams is large, the number of the grouped beam groups may not be limited to two. In general, the beam indexes may not need to be ordered within the first beam group and the second beam group according to the beam power. Alternatively, the grouping unit 1030 may also arrange the beam indexes of the plurality of beams included in the first beam group or the second beam group, for example, according to the beam power as described above, and the transmitting unit 1020 transmits the arranged beam indexes to the base station. Accordingly, based on the number of beams included in the first beam group and/or the second beam group and the transmitting order of the beam indexes, the base station may obtain information about the beam power of the beams indicated thereby.

According to another embodiment of the present disclosure, the transmitting unit 1020 transmits the wideband beam information correspondingly to the beam indexes of the plurality of second beams; and transmits the subband beam information correspondingly to the beam indexes of the plurality of second beams. It is known that channel state indication (CSI) feedback type I may transmit first channel state information to the base station, and the first channel state information may include channel state feedback type indication (CTI), rank (RI), precoding matrix indicator (PMI) and channel quality indication (CQI), and beam information, etc.; and channel state indication (CSI) feedback type II may transmit second channel state information to the base station, the second channel state information may include beam number information (for example, which may be the superior beam number information as described above), PMI, and beam information, etc. According to an embodiment of the present disclosure, the beam information may include the wideband beam information and the subband beam information, the wideband beam information may include wideband amplitude information, and the subband beam information may include subband amplitude information, subband phase information, and subband co-phase information. The PMI may include a beam index.

It can be seen that the first channel state information and the second channel state information may each include beam information and PMI. Therefore, the transmitting unit 1020, by using channel state indication (CSI) feedback type I and/or channel state indication (CSI) feedback type II, may transmit the wideband beam information and the subband beam information correspondingly to the beam indexes of the plurality of second beams. It should be understood that the above-mentioned wideband beam information and subband beam information may be transmitted to the base station by the transmitting unit 1020 periodically or non-periodically.

According to an embodiment of the present disclosure, the transmitting unit 1020 may feed back the beam information by using channel state indication (CSI) feedback type I and channel state indication (CSI) feedback type II together, that is, transmitting the beam information in a differential manner. For example, the transmitting unit 1020 may feed back the wideband beam information of the first beam using channel state indication (CSI) feedback type I, and feed back the subband amplitude information, subband phase information, and subband co-phase information using channel state indication (CSI) feedback type II.

According to another embodiment of the present disclosure, the transmitting unit 1020 may transmit the beam index and subband beam information of the first beam, and the beam indexes, wideband beam information and subband with beam information of the plurality of second beams only using channel state indication (CSI) feedback type II. Specifically, the user equipment feeds back all of the wideband amplitude information, subband amplitude information, subband phase information, and subband co-phase information of the beams to be fed back to the base station by using channel state indication (CSI) feedback type II.

According to an embodiment of the present disclosure, for the beams having different beam power among the plurality of second beams, different bits may be allocated to the wideband beam information and the subband beam information of the second beams. In other words, for a superior beam with stronger beam power and a weak beam with weaker beam power, the signaling overhead for feeding back their beam information are different, in this way, the signaling overhead can be effectively saved. In this way, it is needed to determine the number of the superior beams in the second beams so as to properly allocate the required bit number.

According to an embodiment of the present disclosure, in addition to transmitting the wideband beam information and the subband beam information correspondingly to the beam indexes of the plurality of second beams, the transmitting unit 1020 also transmits a new feedback type of superior beam number information K, and the superior beam number information K indicates the number of the superior beams in the plurality of second beams. In other words, by feeding back the superior beam number information K to the base station together with the beam information to be fed back, the base station is able to know that, in addition to the first beam, there are K strong beams in the second beams to be fed back, correspondingly, the remaining second beams are considered to be fed back as weak beams. In this way, in the case where the transmitting order of the plurality of second beams has been determined as described above, in combination with the superior beam number information K, the base station is able to know which specific beams are superior beams (i.e., strong beams), and which are weak beams.

According to an embodiment of the present disclosure, the user equipment 1000 further includes a threshold setting unit 1040 configured to, in a case where the transmitting order of the plurality of second beams is not determined, determine a beam power threshold in advance, and compare the beam power threshold with the power of the plurality of second beams, so as to determine the superior beams in the plurality of second beams, wherein the beam power of the superior beams is higher than the beam power of other beams in the second beam group. In this way, the plurality of second beams may be divided into the first beam group and the second beam group. For example, the beam power threshold is set to ½ in advance, and the plurality of second beams are compared with the set power threshold. If the second beam is greater than or equal to the power threshold, the second beam is a superior beam, that is, a strong beam. Conversely, if the second beam is lower than the power threshold, the second beam is a weak beam. In this example, as described above, it is assumed that the power level of the selected first beam b1 is 1, the beam power level of the second beam b4 relative to the first beam b1 is ½, the beam power level of the beam b8 relative to the first beam b1 is ⅛, and the beam power level of the beam b12 relative to the first beam b1 is ¼, then the beam b4 is the superior beam in the second beams, and b8, b12 are weak beams in the second beams. Then, in step S102, the beam indexes arranged according to the first beam group and the second beam group are transmitted to the base station, and in steps S103 and S104, the wideband beam information and the subband beam information are transmitted correspondingly to the beam indexes of the plurality of second beams respectively.

According to an embodiment of the present disclosure, after determining the respective numbers of the superior beams and the weak beams, it is also needed to determine the bit number required for the wideband beam information and the subband beam information of the respective superior beams and weak beams, such that the beam information may be appropriately adjusted.

According to an embodiment of the present disclosure, the user equipment 1000 further includes a bit allocation unit 1050 configured to allocate the same bit number to the wideband beam amplitude information of the plurality of second beams, for example, the wideband beam amplitude information of the second beams b4, b8 and b12 are each allocated 3 bits to indicate that the beam power of the beam is one of the predefined eight levels. In addition, different bit numbers may be allocated to the subband beam information of the plurality of second beams. For example, the subband beam amplitude information of the plurality of second beams are allocated different bit numbers. Specifically, as described above, b4 is determined as the superior beam in the second beams by the method as described above, and correspondingly, b8, b12 are weak beams in the second beams. In this case, only the subband amplitude information of the superior beam b4 in the second beams is allocated 1 bit to adjust its wideband amplitude information, and no bit is allocated to the subband amplitude information of the beams b8, b12.

According to another embodiment of the present disclosure, the bit allocation unit 1050 may also allocate different bit numbers to the wideband beam amplitude information of the plurality of second beams. As previously mentioned, it has been determined that b4 is the superior beam in the second beams, and accordingly, b8, b12 are the weak beams in the second beams. In this case, for example, 3 bits are allocated to the superior beam b4, however, the beam power of the beam b8 may only be lower than or equal to the beam power of the superior beam b4, obviously, the value range of the beam power levels for the beam b8 is small, so fewer bits are needed for the beam b8 to indicate the available beam power levels as compared with the beam b4. Similarly, the value range of the beam power levels for the beam b12 is smaller, so much fewer bits are needed for the beam b12 to indicate the available beam power levels. Specifically, in the case of determining that 3 bits are required for the wideband beam amplitude information of the beam b4, then it is determined that 2 bits are required for the wideband beam amplitude information of the beam b8, and it is determined that 2 or 1 bits are required for the wideband beam amplitude information of the beam b12. In this way, the overhead of signaling can be saved and the wideband amplitude information of the beams can be effectively fed back.

Alternatively, according to another embodiment of the present disclosure, the beam power levels may be represented by a form of its ratio with a previous stronger beam power level. As previously mentioned, it has been determined that b4 is the superior beam in the second beams, and accordingly, b8, b12 are the weak beams in the second beams. Similarly, since the value ranges of the beam power levels of b4, b8 and b12 are in descending order, as shown in FIG. 9B, the bit allocation unit 1050 may allocate 3 bits to the superior beam b4 to indicate the ratio between the beam b4 and the first beam b1, and allocate 2 bits to the beam b8 which requires small number of bits to indicate the ratio between the beam b8 and the superior beam b4, and allocate 2 or 1 bits to the beam b12 which requires smaller number of bits to indicate the ratio between the beam b12 and the superior beam b8.

<Hardware Structure>

Figure 11:
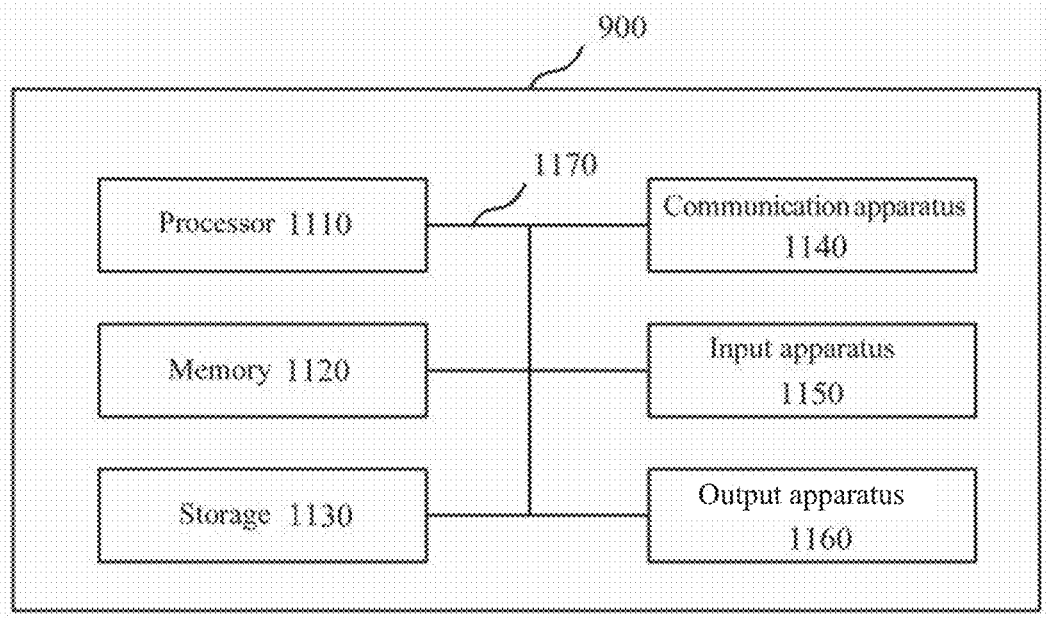
FIG. 11 is a configuration diagram showing a hardware configuration of a user equipment according to an embodiment of the present disclosure.

A user equipment or the like in an embodiment of the present invention may play a role of a computer performing processing of wireless communication methods of the present invention. FIG. 11 is a diagram of an example showing hardware constitution of a wireless base station and a user terminal according to an embodiment of the present invention. The above user terminal 900 may be physically constituted as a computer apparatus comprising a processor 1110, a memory 1120, a storage 1130, a communication apparatus 1140, an input apparatus 1150, an output apparatus 1160, a bus 1170, etc.

In addition, in the following description, the term "apparatus" may be interpreted as a circuit, a device, a unit or the like. The hardware constitution of the user terminal 1000 may be constituted to include one or more apparatuses shown in the figure, or may be constituted without including a part of the apparatuses.

For example, only one processor 1110 is illustrated, but there may be multiple processors. In addition, the processing may be performed by one processor, or may be performed by one or more processors simultaneously, sequentially, or by other methods. Additionally, the processer 1110 may be assembled by using more than one chips.

Respective functions of the user equipment 1000 are implemented by reading designated software (program) on hardware such as the processer 1110 and the memory 1120, by computation of the processor 1110, by communication performed by controlling the communication apparatus 1140, and by reading and/or writing of data in the memory 1120 and the storage 1130.

The processor 1110, for example, operates an operating system to control the entire computer. The processor 1110 may be constituted by a central processing apparatus (CPU: central processing unit) comprising an interface with a peripheral apparatus, a control apparatus, a computing apparatus, a register, etc. For example, the determining unit 1010, grouping unit 1030, threshold setting unit 1040, bit allocating unit 1050, and the like may be implemented by the processor 1110.

In addition, the processor 1110 reads programs (program code), software modules and data from the storage 1130 and/or the communication apparatus 1140 to the memory 1120, and execute various processing in accordance with contents thereof. As a program, a program causing the computer to execute at least a part of the operations described in the above embodiments is used.

The memory 1120 is a computer-readable recording medium, and may be constituted, for example, by at least one of a ROM (a Read Only Memory), an EPROM (Erasable Programmable ROM), an EEPROM (Electrically Erasable Programmable ROM), a RAM (Random Access Memory), and other suitable storage medium. The memory 1120 may be referred to as a register, a cache memory, a main memory (a main storage apparatus), etc. The memory 1120 can store executable programs (program code), software modules or the like for implementing the wireless communication method of an embodiment of the present invention.

The storage 1130 is a computer-readable recording medium, and may be constituted, for example, by at least one of an optical disk such as a flexible disk, a soft (registered trademark) disk (floppy disk), a magnetic optical disk (e.g., CD-ROM (Compact Disc ROM), a digital versatile disk and a Blu-ray disk (registered trademark)), a removable disk, a hard drive, a smart card, a flash device (e.g., a flash memory card, a flash memory stick, a key driver), a magnetic stripe, a database, a server and other suitable storage medium. The storage 1130 may be referred to as an auxiliary storage device.

The communication apparatus 1140 is a hardware (transceiver device) performing communication between computers via a wired and/or wireless network, which is also referred to as a network device, a network controller, a network card, a communication module or the like, for example. The communication device 1140 may include a high frequency switch, a duplexer, a filter, a frequency synthesizer, etc., in order to implement, for example, Frequency Division Duplex (FDD) and/or Time Division Duplex (TDD). For example, the above-described transmitting unit 1020 or the like can be implemented by the communication device 1140.

The input apparatus 1150 is an input device accepting input from the outside (e.g., a keyboard, a mouse, a microphone, a switch, a button, a sensor, etc.). The input apparatus 1160 is an output device implementing output to the outside (e.g., a display, a speaker, a LED (light emitting diode), etc.). It should be noted that the input apparatus 1150 and the output apparatus 1160 may be an integrated structure (e.g., a touch screen).

In addition, the respective apparatuses such as the processor 1110 and the memory 1120 are connected by the bus 1170 that communicates information. The bus 1170 may be constituted by a single bus or different bus between the apparatuses.

In addition, the user equipment 1000 may constituted by comprising a hardware such as a microprocessor, a digital signal processor (DSP), an ASIC (Application Specified Integrated Circuit), a PLD (Programmable Logic Device), an FPGA (Field Programmable Gate Array), etc., and the hardware may be used to implement a part of or all of the respective functional blocks. For example, the processor 1110 may be assembled by using at least one of the hardware.

<Variation>

In addition, the terms described in the present specification and/or terms needed to understand the present specification may be replaced with terms having the same or similar meanings. For example, a channel and/or a symbol may be a signal (signaling). In addition, a signal may be a message. For example, the channel and/or symbol may also be a signal. In addition, the signal can also be a message. A reference signal may also be simply referred to as a RS (Reference Signal), and may also be referred to as a pilot (Pilot), a pilot signal, or the like according to applicable standards. In addition, a component carrier (CC) may also be referred to as a cell, a frequency carrier, a carrier frequency, or the like.

In addition, information, parameters, etc. described in the present specification may be represented by absolute values, relative values with designated values or other corresponding information. For example, wireless resource may be indicated by indexes. Furthermore, equations or the like using these parameters are sometimes different from that explicitly disclosed in the present specification.

Names used for the above parameters are not restricted at any time. For example, various channels (e.g., Physical Uplink Control Channel (PUCCH), Physical Downlink Control Channel (PDCCH), etc.) and information elements may be identified using any suitable name, so these various names allocated to the various channels and information elements are not restricted at any time.

Information, signal or the like described in the present specification may be represented using any of a variety of different technologies. For example, data, instructions, commands, information, signal, bit, symbol, chip, etc. referred to throughout the above description may represent using voltage, current, electromagnetic waves, magnetic fields or magnetic particles, optical fields or photons, or any combination thereof.

Further, information, signal or the like may be output from a upper layer to a lower layer, and/or from a lower layer to a upper layer. Information, signal or the like may be input or output via a plurality of network nodes.

Input/output information may be stored in a specific place (such as the memory) or managed by a management table. The input/output information can be overwritten, updated or added. The output information may be deleted. The input information may be transmitted to other apparatuses.

The notification of information is not limited to the mode/embodiment described in the specification, and may be performed by other methods. For example, the notification of information may be through physical layer signaling (for example, Downlink Control Information (DCI), Uplink Control Information (UCI), and upper layer signaling (for example, Radio Resource Control (RRC) signaling, broadcast information (Master Information Block (MIB), System Information Block (SIB) or the like), Medium Access Control (MAC) signaling), other signals, or a combination thereof.

Further, the physical layer signaling may be referred to as L1/L2 (Layer 1/Layer 2) control information (L1/L2 control signal), L1 control information (L1 control signal), and the like. In addition, the RRC signaling may also be referred to as an RRC message, and may be, for example, an RRC Connection Setup message, an RRC Connection Reconfiguration message, or the like. Furthermore, the MAC signaling can be notified, for example, by a MAC Control Element (MAC CE).

In addition, notification of designated information (for example, the notification of "X") is not limited to being explicitly performed, and may be implicitly performed (for example, by not notifying the designated information, or by the notification of other information).

The deciding may be performed by using a value (0 or 1) represented by 1 bit, or by using a true or false value (Boolean: true or false), or by using comparison of numerical values (for example, comparison with a designated value).

The software described above can be broadly interpreted as instructions, instruction sets, code, code segments, program code, programs, sub-programs, software modules, applications, software packages, routines, sub-routines, objects, executable files, execution threads, steps, functions, etc., irrelevant with being referred to as software, firmware, middleware, microcode, hardware description language or other names.

In addition, software, instructions, etc. may be transmitted and received via a transmission medium. For example, in case that the software is transmitted from a web page, a server or other remote data source using wired technologies such as coaxial cables, fibers, twisted pairs and digital subscriber lines (DSLs) and/or wireless technologies such as infrared ray, radio and microwave, these wired technologies and/or wireless technologies are included in the definition of the transmission medium.

Terms such as "system" and "network" used in this specification are used interchangeably.

In the present specification, the terms such as "base station (BS)", "radio base station", "eNB", "gNB", "cell", "section", "cell group", "carrier", and "component carrier" can be used interchangeably in the present specification. The base station is sometimes also referred to as a fixed station, a NodeB, an eNodeB (eNB), an access point, a transmission point, a reception point, a femto cell, a small cell, etc.

The base station can accommodate one or more (for example, three) cells (also referred to as sections). In a case where the base station accommodates a plurality of cells, coverage area of the base station as a whole can be divided into a plurality of smaller areas, and each smaller area can provide communication services using a subsystem of the base station (for example, a small base station RRH for indoor use: a remote radio head). The terms "cell" and "section" refer to a part of or the entirety of a coverage area of the base station and/or a subsystem of the base station that providing communication services.

In the present specification, terms such as "Mobile Station (MS)", "User Terminal", "User Equipment (UE)", and "terminal" are used interchangeably. The base station is sometimes also referred to as a fixed station, a NodeB, an eNodeB (eNB), an access point, a transmission point, a reception point, a femto cell, a small cell, etc.

The mobile station, varying from persons skilled in the art, is sometimes referred to as a user station, a mobile unit, a user device, a wireless unit, a remote unit, a mobile device, a wireless device, a wireless communication device, a remote device, a mobile user station, an access terminal, a mobile terminal, a wireless terminal, a remote terminal, a handheld terminal, a user agent, a mobile client, a client, or other suitable terms.

In addition, the wireless base station in the present specification may also be replaced with a user terminal. For example, each mode/embodiment of the present disclosure can be applied to a configuration in which communication between a base station and a user terminal is replaced with Device-to-Device (D2D) communication. At this time, the function of the above-described wireless base station can be regarded as a function of the user terminal. In addition, words such as "uplink" and "downlink" can also be replaced with "side". For example, the uplink channel can also be replaced with a side channel.

Similarly, the user terminal in the present specification can also be replaced with a base station. At this time, the function of the user terminal 800 described above can be regarded as a function of the wireless base station 700.

In the present specification, particular operations performed by the base station may be performed by an upper node thereof for some reasons in some cases. In a network comprised of one or a plurality of network nodes having the base station, it is obvious that various operations performed for communication with the terminal may be performed by the base station or other network nodes (e.g., MME (Mobility Management Entity), S-GW (Serving-Gateway) and so on, but the invention is not limited thereto) than the base station.

The manners/implementations described in the present specification may be used alone or in combination, or may be switched in accordance with execution. Orders of the processing steps, procedures, flow charts and the like of the respective manners/implementations described in the present invention may be replaced as long as there is no contradiction. For example, the methods described in the present specification exhibit elements of the various steps in the orders of the examples, and are not limited to specific orders exhibited.

The respective manners/implementations described in the present specification may be applied to LTE (Long Term Evolution), LTE-A (LTE-advanced), LTE-B (LTE-Beyond), SUPER 3G IMT-Advanced, 4G, 5G, FRA (Future Unlimited Access), New-RAT (Radio Access Technology), NR (New Radio), NX (New radio access), FX (Future generation wireless access), GSM (registered trademark), CDMA2000, UMB (Ultra Mobile Broadband), IEEE802.11 (Wi-Fi (registered trademark)), IEEE802.16 (WiMAX (registered trademark)), IEEE802.20, UWB (Ultra Broadband), Bluetooth (registered trademark (registered trademark)), a system employing other suitable systems and/or a next-generation system that are extended based on these systems.

The term "based on" used in the present specification do not mean "only based on" unless it is explicitly stated. In other words, the "based on" has two meanings: "only based on" and "based at least on".

Any reference to elements using terms like "first" and "second" used in the present specification does not fully restrict quantity or order of these elements. These terms can be used in the present specification as a convenient method distinguishing between more than two elements. Therefore, a reference to a first and a second element does not mean that only two elements can be used, or that the second element must, in any form, be preceded by the first element.

The terms such as "deciding" and "determining" used in the present specification sometimes comprise a wide variety of operations. The "deciding" and "determining" may include regarding, for example, calculating, computing, processing, deriving, investigating, looking up (e.g., looking up in a table, a database or other data structures) and ascertaining, as performing the "deciding" and "determining". In addition, the "deciding" and "determining" may include regarding receiving (e.g., receiving information), transmitting (for example, transmitting information), inputting, outputting and accessing (e.g., accessing data in the memory) as performing the "deciding" and "determining". In addition, the "deciding" and "determining" may include regarding resolving, selecting, choosing, establishing, comparing and the like as performing the "deciding" and "determining". That is to say, the "deciding" and "determining" may include regarding certain operations as the "deciding" and "determining".

The terms "connected" or "coupled" as used in the present specification, or any variant thereof, refer to any direct or indirect connection or coupling between two or more units, which includes the case where there is one or more intermediate units between two units that are "connected" or "coupled" to each other. The coupling or connection between the units may be physical, logical, or a combination thereof. For example, "connection" can also be replaced with "access". When used in the present specification, two units may be considered to be "connected" or "coupled" to each other by using one or more wires, cables, and/or printed electrical connection, and as a non-limiting and non-exhaustive example, by using electromagnetic energy of wavelength having radio frequency region, microwave region, and/or light (both visible and invisible) region.

When terms such as "include," "comprise" and variations of these are used in this specification or in claims, these terms are intended to be inclusive, like the term "provide". Furthermore, the term "or" used in the context of the present specification or claims does not mean exclusive or.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A beam information feedback method performed by a user equipment, comprising:
   determining a first beam and a plurality of second beams according to a beam selection result;
   transmitting beam indexes of the plurality of second beams to a base station according to the beam power of the plurality of second beams;
   transmitting wideband beam information correspondingly to the beam indexes of the plurality of second beams; and
   transmitting subband beam information correspondingly to the beam indexes of the plurality of second beams.

2. The method of claim 1, wherein transmitting beam indexes of the plurality of second beams to a base station according to the beam power of the plurality of second beams comprises:
   determining a transmitting order of the plurality of second beams according to the beam power; and
   transmitting the beam indexes of the plurality of second beams according to the determined transmitting order.

3. The method of claim 1, wherein transmitting beam indexes of the plurality of second beams to a base station according to the beam power of the plurality of second beams comprises:
   dividing the plurality of second beams into a first beam group and a second beam group according to the beam power, wherein the beam power of a beam in the first beam group is higher than the beam power of a beam in the second beam group; and
   transmitting the beam indexes arranged according to the first beam group and the second beam group to the base station.

4. The method of claim 1, further comprising:
   transmitting a number of superior beams in the plurality of second beams to the base station, wherein the beam power of the superior beam is higher than the beam power of other beams in the second beam group.

5. The method of claim 1, further comprising:
   determining a beam power threshold of superior beams in the plurality of second beams in advance, wherein the beam power of the superior beam is higher than the beam power of other beams in the second beam group.

6. The method of claim 1, wherein
   the beam indexes, wideband beam information, and subband beam information of the plurality of second beams are transmitted using channel state indication (CSI) feedback type II,
   the method further comprising:
   transmitting a beam index and subband beam information of the first beam using channel state indication feedback type I.

7. The method of claim 1, further comprising:
transmitting a beam index of the first beam when transmitting the beam indexes of the plurality of second beams to the base station, wherein the transmitting order of the beam index of the first beam and the beam indexes of the plurality of second beams are determined according to the beam power of the first beam and the plurality of second beams; and
transmitting subband beam information correspondingly to the beam index of the first beam when transmitting subband beam information correspondingly to the beam indexes of the plurality of second beams.

8. The method of claim 7, wherein
the beam index and subband beam information of the first beam, and the beam indexes, wideband beam information and subband beam information of the plurality of second beams are transmitted using channel state indication (CSI) feedback type II.

9. The method of claim 1, wherein
the wideband beam information comprises wideband beam amplitude information,
the method further comprising:
 determining a bit number required for transmitting the wideband beam amplitude information of respective beams of the plurality of second beams according to the beam power of the plurality of second beams.

10. A user equipment, comprising:
a determining unit configured to determine a first beam and a plurality of second beams according to a beam selection result;
a transmitting unit configured to transmit beam indexes of the plurality of second beams to a base station according to the beam power of the plurality of second beams; transmit wideband beam information correspondingly to the beam indexes of the plurality of second beams, and transmit subband beam information correspondingly to the beam indexes of the plurality of second beams.

11. The user equipment of claim 10, wherein
the transmitting unit determines a transmitting order of the plurality of second beams according to the beam power, and transmits the beam indexes of the plurality of second beams according to the determined transmitting order.

12. The user equipment of claim 10, further comprising:
a grouping unit configured to divide the plurality of second beams into a first beam group and a second beam group according to the beam power, wherein the beam power of a beam in the first beam group is higher than the beam power of a beam in the second beam group; and
wherein the transmitting unit transmits the beam indexes arranged according to the first beam group and the second beam group to the base station.

13. The user equipment of claim 10, wherein
the transmitting unit further configured to transmit a number of superior beams in the plurality of second beams to the base station, wherein the beam power of the superior beam is higher than the beam power of other beams in the second beam group.

14. The user equipment of claim 10, further comprising:
a threshold setting unit configured to determine a beam power threshold of superior beams in the plurality of second beams in advance, wherein the beam power of the superior beam is higher than the beam power of other beams in the second beam group.

15. The user equipment of claim 10, wherein
the transmitting unit configured to transmit the beam indexes, wideband beam information, and subband beam information of the plurality of second beams using channel state indication (CSI) feedback type II, and
the transmitting unit further configured to transmit a beam index and subband beam information of the first beam using channel state indication feedback type I.

16. The user equipment of claim 10, wherein
the transmitting unit further transmits a beam index of the first beam when transmitting the beam indexes of the plurality of second beams to the base station, wherein the beam index of the first beam and the beam indexes of the plurality of second beams are arranged according to the beam power of the first beam and the plurality of second beams; and
the transmitting unit further transmits subband beam information correspondingly to the beam index of the first beam when transmitting subband beam information correspondingly to the beam indexes of the plurality of second beams.

17. The user equipment of claim 16, wherein
the transmitting unit transmits the beam index and subband beam information of the first beam, and the beam indexes, wideband beam information and subband beam information of the plurality of second beams using channel state indication (CSI) feedback type II.

18. The user equipment of claim 10, wherein
the wideband beam information comprises wideband beam amplitude information,
the user equipment further comprising:
 a bit allocation unit configured to determine a bit number required for transmitting the wideband beam amplitude information of respective beams of the plurality of second beams according to the beam power of the plurality of second beams.

* * * * *